United States Patent
Zaman et al.

(10) Patent No.: US 9,904,894 B2
(45) Date of Patent: Feb. 27, 2018

(54) USER SPECIFIC LOCATION ASSIGNMENT AND VALUATION

(71) Applicant: Terminal-0, Inc., Toronto (CA)

(72) Inventors: Aqeel Zaman, Toronto (CA); Sacha Amar Dario Singh, Ajax (CA); Phillis Mary McCulloch, Toronto (CA)

(73) Assignee: Terminal-0, Inc., Toronto, ON (CA)

( * ) Notice: Subject to any disclaimer, the term of this patent is extended or adjusted under 35 U.S.C. 154(b) by 746 days.

(21) Appl. No.: 14/195,734

(22) Filed: Mar. 3, 2014

(65) Prior Publication Data

US 2014/0249867 A1 Sep. 4, 2014

Related U.S. Application Data

(60) Provisional application No. 61/771,706, filed on Mar. 1, 2013.

(51) Int. Cl.
*G06Q 10/00* (2012.01)
*G06Q 10/02* (2012.01)
*G06Q 50/00* (2012.01)
*G06Q 30/02* (2012.01)

(52) U.S. Cl.
CPC ............. *G06Q 10/02* (2013.01); *G06Q 30/02* (2013.01); *G06Q 50/01* (2013.01)

(58) Field of Classification Search
CPC .............................. G06Q 10/02; G06Q 50/01
See application file for complete search history.

(56) References Cited

U.S. PATENT DOCUMENTS

| | | | | |
|---|---|---|---|---|
| 9,009,229 B2* | 4/2015 | Savir | ...................... | H04L 67/26 709/204 |
| 9,092,813 B2* | 7/2015 | Pappas | .................. | G06Q 10/00 |
| 2009/0065642 A1* | 3/2009 | Cheung | .................. | B64D 11/00 244/118.6 |
| 2012/0323612 A1* | 12/2012 | Callaghan | .............. | G06Q 10/02 705/5 |
| 2014/0129629 A1* | 5/2014 | Savir | ...................... | H04L 67/26 709/204 |

* cited by examiner

*Primary Examiner* — Christopher L Gilligan
(74) *Attorney, Agent, or Firm* — Sheppard, Mullin, Richter & Hampton LLP

(57) ABSTRACT

Systems and methods for assigning a user to a physical location. User data that includes characteristics of a user is acquired. The user is matched with an attendee based on the user characteristics and attendee characteristics of the attendee. A physical location is determined based on a location that the attendee matched to the user will occupy. A notification including an identification of the physical location, an identification of the attendee, and the attendee characteristics are sent to the user. Input is received that indicates whether the user wants to obtain a right to occupy the physical location and if the input indicates that the user wants to obtain the right to occupy the physical location, then the right to occupy the physical location is obtained.

20 Claims, 8 Drawing Sheets

USER SPECIFIC LOCATION ASSIGNMENT AND VALUATION

CROSS-REFERENCE TO RELATED APPLICATIONS

The present application claims priority to U.S. Provisional Patent Application Ser. No. 61/771,706, filed Mar. 1, 2013 and entitled "Location Valuation and Assignment," which is hereby incorporated by reference herein.

BACKGROUND

An area of ongoing research and development is social networks. Today social networks have been incorporated into every increased aspects of people's lives. As a result, people have made available through social networks a wealth of information about themselves. Specifically, people post major milestones in their lives, their likes and interests, organizations and clubs that they are members of, and their educational backgrounds onto social networks.

While a great amount of information is available that can be used to characterize users of social networks, technology has begun to evolve in developing new ways to exploit this great amount of information. In particular technology continues to develop new ways of connecting people using this great amount of information. However, technology has neglected how this great amount of information can be used to connect people in occupying a physical location or neighboring physical locations for periods of time. For example, in an airplane people are seated randomly next to people who they do not know based on the ticket that they purchase and not based on information about the characteristics of the passengers. There therefore exists a need for allowing people to obtain a right to occupy a physical location based on characteristics of attendees who will occupy the same physical location or neighboring physical locations.

Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for assigning a user to a physical location. In various implementations, user data that includes characteristics of a user is acquired. Further, in various implementations, the user is matched with an attendee based on the user characteristics and attendee characteristics of the attendee. In various implementations, a physical location is determined based on a location that the attendee matched to the user will occupy. Additionally, in various implementation, a notification including an identification of the physical location, an identification of the attendee, and the attendee characteristics are sent to the user. Input is received that indicates whether the user wants to obtain a right to occupy the physical location and if the input indicates that the user wants to obtain the right to occupy the physical location, then the right to occupy the physical location is obtained.

These and other advantages will become apparent to those skilled in the relevant art upon a reading of the following descriptions and a study of the several examples of the drawings.

DETAILED DESCRIPTION

Figure 1:
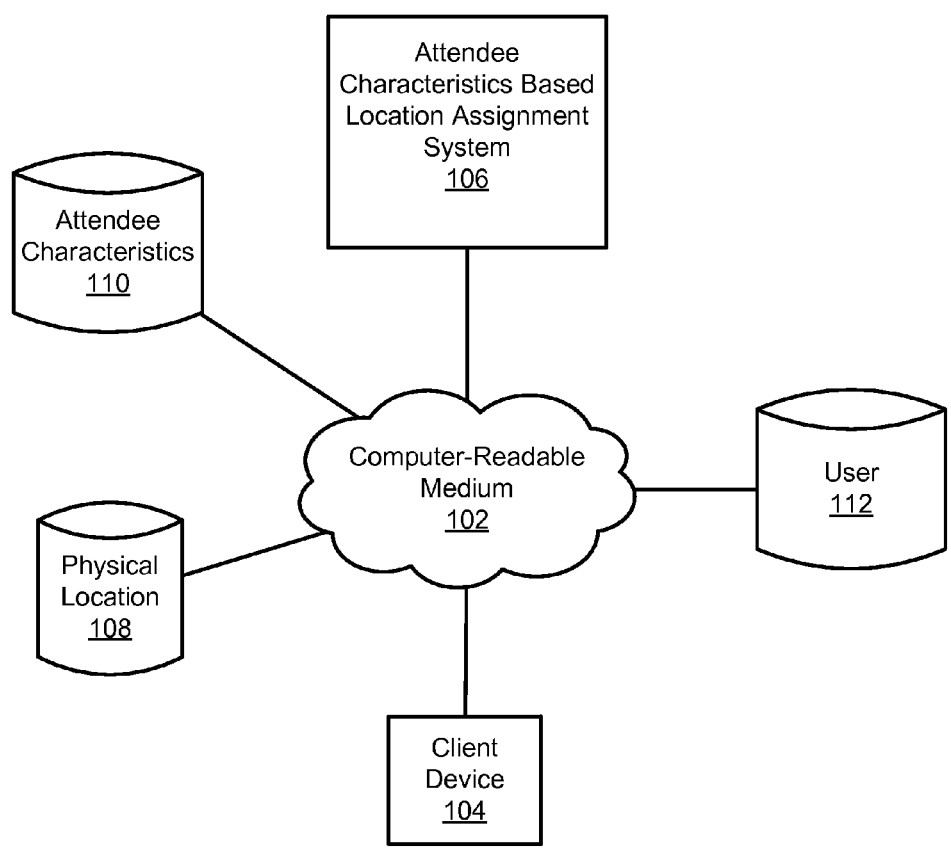
FIG. 1 depicts a diagram of an example of a system for determining a value of a right to occupy a location and assigning rights to occupy a location.

FIG. 1 depicts a diagram 100 of an example of a system for determining a value of a right to occupy a location and assigning rights to occupy a location. The system of the example of FIG. 1 includes a computer readable-medium 102, a client device 104, an attendee characteristics based location assignment system 106, a physical location datastore 108, an attendee characteristics datastore 110, and a user datastore 112.

In the example system shown in FIG. 1, the client device 104, the attendee characteristics based location assignment system 106, the physical location datastore 108, the attendee characteristics datastore 110, and the user datastore 112 are coupled to each other through the computer-readable medium. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the client device 104, the attendee characteristics based location assignment system 106 and other applicable systems, or devices described in this paper can be implemented as a computer system, a plurality of computer systems, or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the client device 104 functions according to an applicable device for sending and receiving data. Depending upon implementation-specific or other considerations, the client device 104 can be thin client devices or ultra-thin client devices. Further depending upon implementation-specific or other considerations, the client devices 104 can include wireless interfaces that allow the client device 104 to connect to the computer-readable medium 102 through a wireless connection. The client device 104 can include user interfaces through which users can interact with data that is received by the client device 104. In sending and receiving data through the client device 104, users can view characteristics of attendees who will occupy physical locations around a specific physical location or the same physical location. In viewing characteristics of attendees who will occupy physical locations around a specific physical location, a user can view characteristics of attendees that are matched to the user. Further in sending and receiving data through the client device 104, users can obtain a right to occupy a physical location.

In a specific implementation, a physical location, as used in this paper, is a location that a single person can occupy at a given time. For example, a physical location can be a seat on an airplane or a seat at a sporting event or a conference. In another specific implementation, a physical location, as used in this paper, is a location that multiple people can occupy at a given time. For example, a physical location can be a suite at a sporting event or a conference. In various implementations, a right to occupy a physical location can be obtained for free or require payment. For example, a physical location can be at a free event that does not require payment to obtain a right to occupy the physical location.

In a specific implementation, the attendee characteristics based location assignment system 106 can function to determine physical locations that a user might want to occupy. In determining specific physical locations that a user might want to purchase a right to occupy, the attendee characteristics based location assignment system can use characteristics of the user and characteristics of attendees who will occupy physical locations around the specific physical locations. For example, if a user is a startup company founder and a an attendee who will occupy a physical location neighboring a specific physical location is a venture capitalist, then the attendee characteristics based location assignment system 106 can determine that the user might want to purchase the right to occupy the specific physical location due to shared or compatible attendee characteristics and user characteristics. Further in determining specific physical locations that a user might want to purchase a right to occupy, the attendee characteristics based location assignment system can use characteristics of the user and characteristics of attendees who will occupy the specific physical locations.

In a specific implementation, the physical location datastore 108 functions to store physical location data of a physical location. Physical location data stored in the physical location datastore 108 can include, for example, the characteristics of the physical location, such as the number of people who can occupy the physical location for a specific amount of time, a description of the physical location, a description of neighboring physical locations, and times a user can occupy the physical location. For example, if a physical location is a seat on an airplane, then physical location data of the physical location can specify what airline is offering the seat, what class the seat is in, and the flight. Physical location data can also include an identification of attendees who will occupy the physical location at a given time or neighboring physical locations at a given time. Depending upon implementation-specific or other considerations, physical location data can also include costs for a user to obtain the right to occupy a physical location. A cost for a right to occupy a physical location can be an amount that a provider of the physical location charges without regard to attendees that will occupy the physical location or neighboring physical locations at the same time. A cost for a right to occupy a physical location can also be an amount that a provider of the physical location charges with regard to attendees that will occupy the physical location or neighboring physical locations at the same time. For example, if a famous person will occupy a specific physical location or a neighboring physical location, then a cost for the right to occupy the physical location can be increased based on the fact that the famous person will occupy the specific physical location or the neighboring physical location.

In a specific implementation, the attendee characteristics datastore 110 functions to store attendee characteristics data that includes attendee characteristics. Depending upon implementation-specific or other considerations, attendee characteristics stored in the attendee characteristics datastore 110 includes attendee characteristics of attendees who will occupy either a specific location that a use can also occupy or locations neighboring the specific location a user can occupy. For example, attendee characteristics can be for attendees who will occupy seats neighboring a specific seat on an airline flight. In another example, attendee characteristics data can be for attendees who will jointly occupy a room or suite at an event. Attendee characteristics can include applicable information about an attendee such as their occupation, their education background, clubs and organizations that they are members of or are associated with, and their interests. Attendee characteristics can also include an identification of an attendee and their contact information, e.g. e-mail address. Depending upon implementation-specific or other considerations, attendee characteristics can be obtained through a social network that an attendee is part of or a physical location provider's server system. Further depending upon implementation-specific or other considerations, attendee characteristics can be obtained from input received by an attendee themselves. For example, a profile can be created for an attendee from input received from the attendee during a previous session in which the attendee was a user of the attendee characteristic based location assignment system 106.

In a specific implementation, the user datastore 112 functions to store user data of a user. User data stored in the user datastore 112 can include user characteristics. User characteristics can be applicable information about a user, such as their occupation, their education background, clubs and organizations that they are members of or are associated with, and their interests. User data can also include an identification of a user and their contact information, e.g. e-mail address.

In a specific implementation, the user datastore 112 functions to store user data of a user interacting with the attendee characteristics based location assignment system 106 through the client device 104. In interacting with the attendee characteristics based location assignment system 106, a user can be presented with specific locations that the attendee characteristics based location assignment system 106 determines that the user might want to obtain a right to access based on characteristics of the user and attendee characteristics. Further in interacting with the attendee characteristics based location assignment system 106, a user can input data indicating whether the user wants to obtain a right to occupy a specific physical location determined by the attendee characteristics based location assignment system 106. Depending upon implementation-specific or other considerations, user data of a user interacting with the attendee characteristics based location assignment system 106 can be input by the user through the client device 104, or obtained from a social network of which the user is part.

In a specific implementation, while the physical location datastore 108, the attendee characteristics datastore 110, and the user datastore 112 are shown as separate datastores in the example system shown in FIG. 1, parts of or the entire physical location datastore 108, the attendee characteristics datastore 110, and the user datastore 112 can be implemented as the same datastore and are merely shown as separate datastores for purposes of description in this paper. Further, depending upon implementation-specific or other considerations, parts of or the entire physical location datastore 108, the attendee characteristics datastore 110, and the user datastore 112 can be implemented as part of the attendee characteristics based location assignment system 106.

In a specific implementation, the attendee characteristics based location assignment system 106 functions to match a user with one or a plurality of attendees based on user characteristics of the user and attendee characteristics. The attendee characteristics based location assignment system 106 can match a user with attendees based on user characteristics stored in the user datastore 112 and attendee characteristics stored in the attendee characteristics datastore 110. In matching a user with attendees based on user characteristics and attendee characteristics, the attendee characteristics based location assignment system 106 can match the user with the attendees if the user and the attendees have characteristics in common, as indicated by the user characteristics and the attendee characteristics. For example, if a user and an attendee both have a common interest of software development, then the attendee characteristics based location assignment system 106 can match the user with the attendee.

In a specific implementation, in matching a user with attendees based on user characteristics and attendee characteristics, the attendee characteristics based location assignment system 106 can match the user with attendees if the user and attendees have compatible characteristics, related characteristics, or codependent characteristics. For example, if a user is a startup company founder and an attendee is a venture capitalist, then the attendee characteristics based location assignment system 106 can determine that the user and the attendee have related or codependent characteristics and subsequently match the user with the attendee.

In a specific implementation, in matching a user with attendees based on user characteristics and attendee characteristics, the attendee characteristics based location assignment system 106 can match the user with attendees who are the subject of a user's likes or interests as indicated by user characteristics. For example, if a user likes or is a fan of a specific actor, and the specific actor is an attendee, then the attendee characteristics based location assignment system 106 can match the user with the specific actor.

In a specific implementation, the attendee characteristics based location assignment system 106 can determine locations that a user might want to occupy based on attendees that are matched with the user. Further in the specific implementation, the attendee characteristics based location assignment system 106 can determine location that a user might want to occupy based on physical location data stored in the physical location datastore 108. Depending upon implementation-specific or other considerations, the attendee characteristics based location assignment system 106 can determine a specific physical locations that an attendee matched to a user will occupy from physical location data stored in the physical location datastore 108. Further depending upon implementation-specific or other considerations, the attendee characteristics based location assignment system 106 can determining a specific physical location with a neighboring physical location that an attendee matched to a user will occupy from physical location data stored in the physical location datastore 108.

In a specific implementation, the attendee characteristics based location assignment system 106 can assign to a user a right to occupy a specific physical location that the attendee characteristics based location assignment system 106 determines that a user might want to occupy. In assigning to a user a right to occupy a specific physical location determined by the attendee characteristics based location assignment system 106, the attendee characteristics based location assignment system 106 can present a description of the specific physical location, including attendee characteristics of attendees that will occupy the specific physical location or neighboring physical locations, to the user through the client device 104. Depending upon implementation-specific or other considerations, in presenting a description of a specific physical location, the attendee characteristics based location assignment system 106 can present a price of the right to occupy the specific physical location to a user. Further in assigning to a user a right to occupy a specific physical location determined by the attendee characteristics based location assignment system 106, the attendee characteristics based location assignment system 106 can receive data from the user that indicates whether the user wants to obtain a right to occupy the specific physical location. Based upon data indicating whether a user want to obtain a right to occupy a specific physical location, the attendee characteristics based location assignment system 106 can obtain the right to occupy the specific physical location, or provide the user with functionality that enables the user to obtain the right to occupy the specific physical location. For example, the attendee characteristics based location assignment system 106 can purchase a right to occupy a specific physical location for a user. In another example, the attendee characteristics based location assignment system 106 can provide to a user a link to a landing page, through which the user can obtain the right to occupy a specific physical location.

In a specific implementation, the attendee characteristics based location assignment system 106 can function to update physical location data after obtaining a right to occupy a physical location for a user. The attendee characteristics based location assignment system 106 can update physical location data stored in the physical location datastore 108. In updating physical location data, the attendee characteristics based location assignment system 106 can update a physical location that the attendee characteristics based location assignment system 106 obtains a right to occupy for a user, with an identification of the user. In updating the physical location data with an identification of a user, the user becomes an attendee and can be matched with other users during other sessions, in which the other users are matched with attendees to determine a physical location.

In a specific implementation, the attendee characteristics based location assignment system 106 can update attendee characteristics after obtaining a right to occupy a physical location for a user. The attendee characteristics based location assignment system 106 can update attendee characteristics data stored in the attendee characteristics datastore 110. In updating attendee characteristics data stored in the attendee characteristics datastore 110, the attendee characteristics based location assignment system 106, can update the attendee characteristics data to include user characteristics of a user who a right to occupy a physical location is obtained, as the user becomes an attendee to the physical location.

In an example of operation of the example system shown in FIG. 1, the client device 104 functions to send and receive data used in presenting physical locations that a user of the client device 104 might want to occupy and sending input to obtain the right to occupy a physical location. In the example of operation of the example system shown in FIG. 1, the physical location datastore 108 functions to store physical location data regarding physical locations that the user can occupy or neighboring physical locations. Further in the example of operation of the example system shown in FIG. 1, the attendee characteristics datastore 110 functions to store attendee characteristics of attendees who will occupy a specific physical location or physical locations that neighbor the specific physical location. In the example of operation of the example system shown in FIG. 1, the user datastore 112 stores user data, including user characteristics of the user. Additionally in the example of operation of the example system shown in FIG. 1, the attendee characteristics based location assignment system 106 matches the user to attendees based on the attendee characteristics stored in the attendee characteristics datastore 110 and user characteristics stored in the user datastore 112. In the example of operation of the example system shown in FIG. 1, the attendee characteristics based location assignment system 106 can determine a physical location that the user might want to occupy based on the attendees matched to the user and the physical location data stored in the physical location datastore 108. Further in the example of operation of the example system shown in FIG. 1, the attendee characteristics based location assignment system 106 can present determined physical locations to the user and obtain a right to occupy a physical location or provide functionalities that allow a user to obtain a right to occupy a determined physical location.

Figure 2:
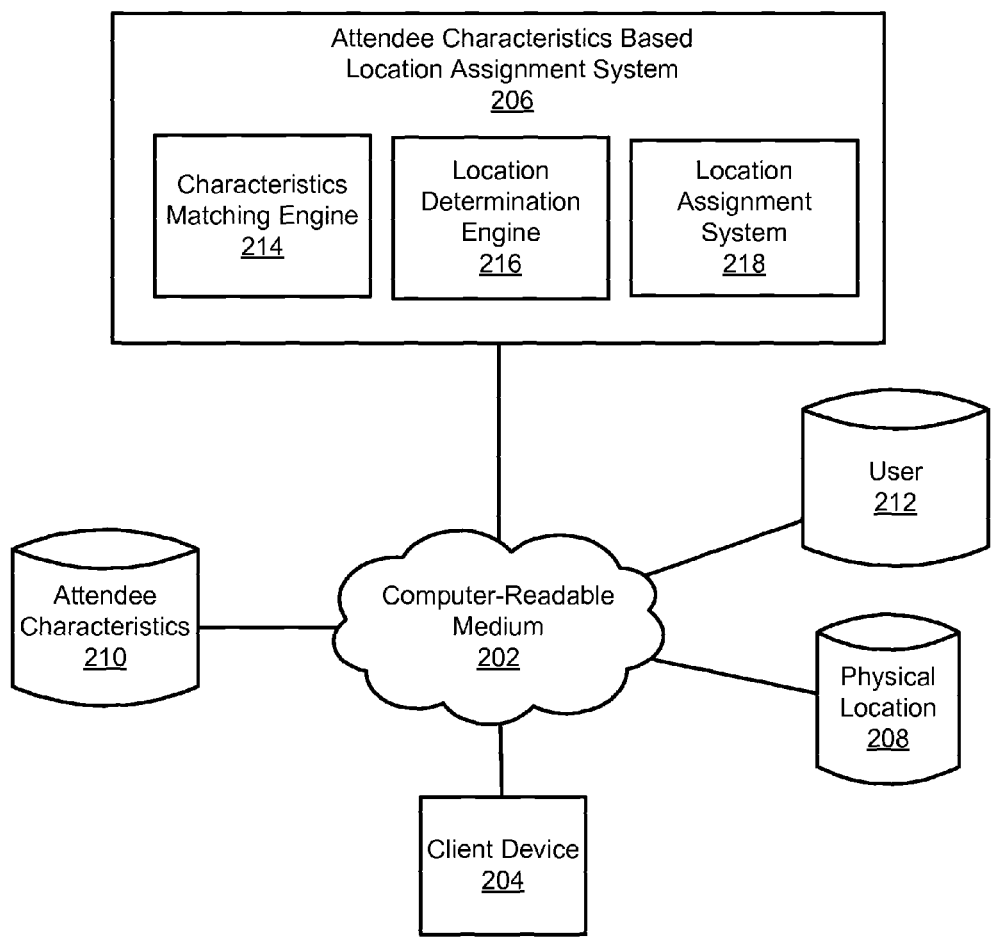
FIG. 2 depicts a diagram of an example of a system for assigning a user a right to occupy a location based on user characteristics and attendee characteristics.

FIG. 2 depicts a diagram 200 of an example of a system for assigning a user a right to occupy a location based on user characteristics and attendee characteristics. The example system shown in FIG. 2 includes a computer-readable medium 202, a client device 204, an attendee characteristics based location assignment system 206, a physical location datastore 208, an attendee characteristics datastore 210, and a use datastore 212. In the example system shown in FIG. 2, the client device 204, the attendee characteristics based location assignment system 206, the physical location datastore 208, the attendee characteristics datastore 210, and the user datastore 212 are coupled to each other through the computer-readable medium 202.

In a specific implementation, the client device 204 functions according to an applicable device for receiving and sending data. In sending and receiving data, the client device 204 can present physical locations to a user of the client device 204 that the user might be interested in obtaining a right to occupy. Further in sending and receiving data, the client device 204 can send input from a user used in obtaining a right to occupy a physical location, including an indication of whether the user wishes to obtain a right to access a physical location.

In a specific implementation, the attendee characteristics based location assignment system 206 functions according to an applicable system for determining and presenting physical locations that a user can occupy, such as the attendee characteristics based location assignment systems described in this paper. In determining and presenting a physical location that a user can occupy, the attendee characteristics based location assignment system 206 can determine the physical location based on user characteristics and attendee characteristics. Further in the specific implementation, the attendee characteristics based location assignment system 206 can function to obtain a right to occupy a physical location or provide functionalities to a user for obtaining the right to occupy the physical location.

In a specific implementation, the physical location datastore 208 functions according to an applicable datastore for storing physical location data, such as the physical location datastores described in this paper. Physical location data stored in the physical location datastore 208 can include characteristics of a physical location, such as the number of people who can occupy the physical location for a specific amount of time, a description of the physical location, a description of neighboring physical locations, and times a user can occupy the physical location. Physical location data stored in the physical location datastore 208 can also include an identification of attendees who will occupy the physical location at a given time or neighboring physical locations at a given time. Depending upon implementation-specific or other considerations, physical location data stored in the physical location datastore 208 can include a cost to obtain a right to occupy a physical location. A cost to obtain a right to occupy a physical location can be a cost from a provider of the physical location without any regard to attendees at the physical location or neighboring physical locations, or a cost that includes an increased value amount based on a match between a user and attendees.

In a specific implementation, the attendee characteristics datastore 210 functions according to an applicable datastore for storing attendee characteristics data. Attendee characteristics data can include characteristics of attendees. Attendee characteristics included as part attendee characteristics data stored in the attendee characteristics datastore 210 can include applicable information about an attendee such as their occupation, their education background, clubs and organizations that they are members of or are associated with, and their interests. Attendee characteristics stored in the attendee characteristics datastore 210 can also include an identification of an attendee and their contact information, e.g. e-mail address. Depending upon implementation-specific or other considerations, attendee characteristics stored in the attendee characteristics datastore 210 can be obtained through a social network that an attendee is part of or a physical location provider's server system. Further depending upon implementation-specific or other considerations, attendee characteristics stored in the attendee characteristics datastore 210 can be obtained from input received by an attendee themselves. For example, a profile can be created for an attendee from input received from the attendee during a previous session in which the attendee was a user of the attendee characteristic based location assignment system 206.

In a specific implementation, the user datastore 212 functions according to an applicable datastore for storing user data, such as the user datastores described in this paper. User characteristics stored in the user datastore 212 can include applicable information about a user, such as their occupation, their education background, clubs and organizations that they are members of or are associated with, and their interests. User data stored in the user datastore 212 can also include an identification of a user and their contact information, e.g. e-mail address. Depending upon implementation-specific or other considerations, user data stored in the user datastore 212 can be received from a client device 204 that a user uses in interacting with the attendee characteristics based location assignment system 206. Further depending upon implementation-specific or other considerations, user data stored in the user datastore 212 can be obtained from a social network of which a user is part.

In the example system shown in FIG. 2, the attendee characteristics based location assignment system 206 includes a characteristics matching engine 214, a location determination engine 216, and a location assignment system 218. In a specific implementation, the characteristics matching engine 214 functions to match a user with an attendee based on characteristics of the user and characteristics of the attendees in a specific implementations, In matching a user with attendees based on user characteristics and attendee characteristics, the characteristics matching engine 214 can match the user with the attendees if the user and the attendees have characteristics in common, as indicated by the user characteristics and the attendee characteristics. For example, if a user and an attendee both have a common interest of software development, then the attendee characteristics based location assignment system 106 can match the user with the attendee.

In a specific implementation, in matching a user with attendees based on user characteristics and attendee characteristics, the characteristics matching engine 214 can match the user with attendees if the user and attendees have compatible characteristics, related characteristics, or codependent characteristics. For example, if a user is a startup company founder and an attendee is a venture capitalist, then the characteristics matching engine 214 can determine that the user and the attendee have related or codependent characteristics and subsequently match the user with the attendee.

In a specific implementation, in matching a user with attendees based on user characteristics and attendee characteristics, the characteristics matching engine 214 can match the user with attendees who are the subject of a user's likes or interests as indicated by user characteristics. For example, if a user likes or is a fan of a specific actor, and the specific actor is an attendee, then the characteristics matching engine 214 can match the user with the specific actor.

In a specific implementation, the location determination engine 216 functions to determine locations that a user might want to occupy. In determining locations that a user might want to occupy, the location determination engine 216 can use attendees that are matched to a user by the characteristics matching engine 214. Further, in determining locations that a user might want to occupy, the location determination engine 216 can use physical location data stored in the physical location datastore 208 that includes identifications of attendees that will occupy specific physical locations. For example, if an attendee is matched to a user, then the location determination engine 216 can use an identification of the attendee and a physical location that the attendee will occupy, as included in physical location data stored in the physical location datastore 208, to determine a physical location. Depending upon implementation-specific or other considerations, the location determination engine 216 determines a physical location that a user might want to occupy that is the same physical location that a matched attendee will occupy. For example, the location determination engine 216 can determine a suite at an event. Further depending upon implementation-specific or other considerations, the location determination engine 216 can determine a physical location that a user might want to occupy with neighboring physical locations that matched attendees will occupy. For example, the location determination engine 216 can determine a seat on an airplane.

In a specific implementation, the location assignment system 218 functions to assign a physical location to a user. The location assignment system 218 can assign a physical location to a user that is determined by the location determination engine 216. In assigning a physical location to a user, the location assignment system 218 can send a notification to a user of the client device 204 of a physical location that is determined for the user by the location determination engine 216. A notification sent by the location assignment system 218 to a user can include identifications of attendees who will occupy a physical location or neighboring physical locations, a description of the physical location, times that the user can occupy the physical location, and a query as to whether the user wants to obtain the right to occupy the physical location. Depending upon implementation-specific or other considerations, the location assignment system 218 can send a notification that includes a price of a right to occupy a physical location.

In a specific implementation, in assigning a physical location to a user, the location assignment system 218 can obtain a right to occupy the physical location for the user. In obtaining a right to occupy a physical location for a user, the location assignment system 218 can receive input from the user indicating whether the user wants to obtain the right to occupy the physical location. In response to input received from a user, the location assignment system 218 can obtain or not obtain a right to occupy a physical location in accordance with whether the input indicates that the user wants to obtain the right to occupy the physical location.

Depending upon implementation-specific or other considerations, the location assignment system 218 can register a user to obtain a right to occupy a physical location for the user. Further depending upon implementation-specific or other considerations, the location assignment system 218 can purchase a right to occupy a physical location for a user. Depending upon implementation-specific or other considerations, the location assignment system 218 can provide functionalities to a user of the client device 204 for obtaining a right to occupy a physical location. For example, the location assignment system 218 can provide a link to a landing page through which a user can obtain a right to occupy a physical location.

In a specific implementation, the location assignment system 218 can function to update physical location data after obtaining a right to occupy a physical location for a user. The location assignment system 218 can update physical location data stored in the physical location datastore 208. In updating physical location data, the location assignment system 218 can update a physical location that the location assignment system 218 obtains a right to occupy for a user, with an identification of the user. In updating the physical location data with an identification of a user, the user becomes an attendee and can be matched with other users during other sessions, in which the other users are matched with attendees to determine a physical location.

In a specific implementation, the location assignment system 218 can update attendee characteristics after obtaining a right to occupy a physical location for a user. The location assignment system 218 can update attendee characteristics data stored in the attendee characteristics datastore 210. In updating attendee characteristics data stored in the attendee characteristics datastore 210, the location assignment system 218, can update the attendee characteristics data to include user characteristics of a user who a right to occupy a physical location is obtained, as the user becomes an attendee to the physical location.

In an example of operation of the example system shown in FIG. 2, the client device 204 functions to receive and send data related to a physical location that a user might be willing to occupy. In the example of operation of the example system shown in FIG. 2, the physical location datastore 208 stores physical location data that includes an identification of attendees who will occupy a physical location or neighboring physical locations to the physical location. Further in the example of operation of the example system shown in FIG. 2, the attendee characteristics datastore 210 stores attendee characteristics of attendees that include identifications of attendees. In the example of operation of the example system shown in FIG. 2, the user datastore 212 stores user data including characteristics and an identification of a user using the client device 204. Additionally, in the example of operation of the example system shown in FIG. 2, the characteristics matching engine 214 matches a user with attendees based on user characteristics and attendee characteristics. In the example of operation of the example system shown in FIG. 2, the location determination engine 216 determines a location that a user might want to occupy based on the attendees matched to the user by the characteristics matching engine 214 and the physical location data stored in the physical location datastore 208. Further, in the example of operation of the example system shown in FIG. 2, the location assignment system 218 can obtain a right to occupy the physical location determined by the location determination engine 216.

Figure 3:
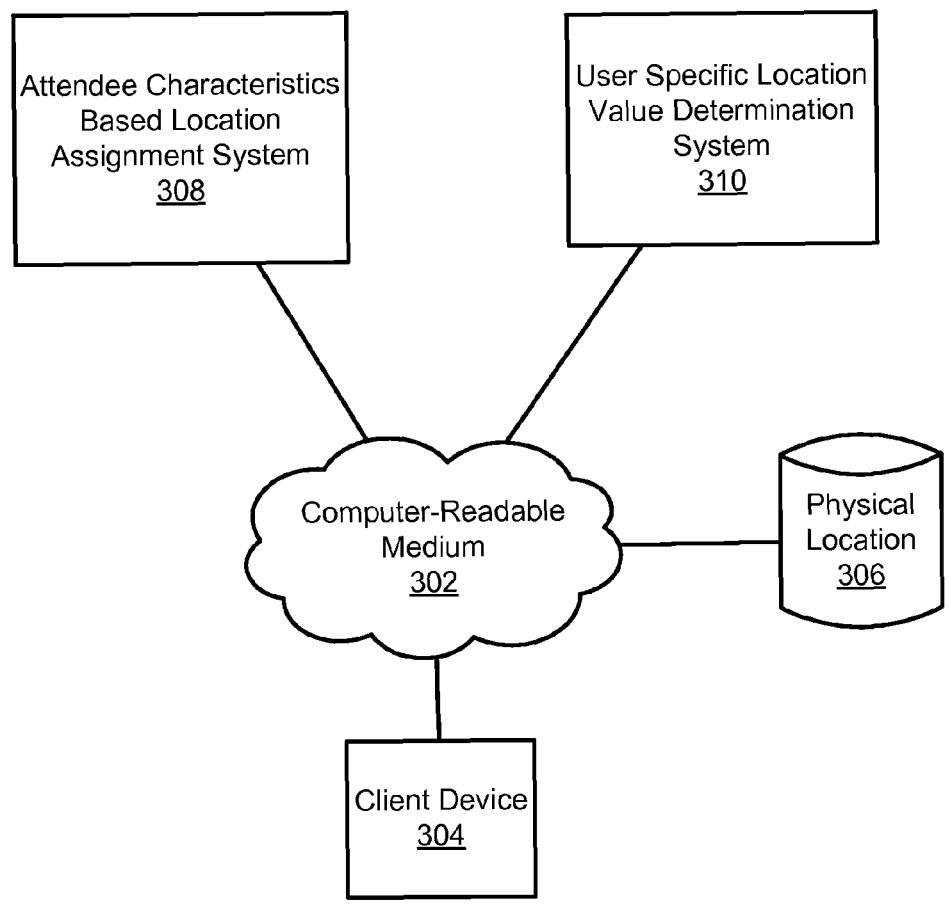
FIG. 3 depicts a diagram of an example of a system for determining a cost specific to a user to obtain a right to occupy a physical location based on attendees that are matched to the user.

FIG. 3 depicts a diagram 300 of an example of a system for determining a cost specific to a user to obtain a right to occupy a physical location based on attendees that are matched to the user. The example system shown in FIG. 3, includes a computer-readable medium 302, a client device 304, a physical location datastore 306, an attendee characteristics based location assignment system 308, and a user specific location value determination system 310. In the example system shown in FIG. 3, the client device 304, the physical location datastore 306, the attendee characteristics based location assignment system 308, and the user specific location value determination system 310 are coupled to each other through the computer-readable medium.

In a specific implementation, the client device 304 functions according to an applicable device for receiving and sending data. In sending and receiving data, the client device 304 can present physical locations to a user of the client device 304 that the user might be interested in obtaining a right to occupy. Further in sending and receiving data, the client device 304 can send input from a user used in obtaining a right to occupy a physical location, including an indication of whether the user wishes to obtain a right to access a physical location.

In a specific implementation, the physical location datastore 306 functions according to an applicable datastore for storing physical location data, such as the physical location datastores described in this paper. Physical location data stored in the physical location datastore 306 can include characteristics of a physical location, such as the number of people who can occupy the physical location for a specific amount of time, a description of the physical location, a description of neighboring physical locations, and times a user can occupy the physical location. Physical location data stored in the physical location datastore 306 can also include an identification of attendees who will occupy the physical location at a given time or neighboring physical locations at a given time. Physical location data stored in the physical location datastore 306 can include a baseline cost to obtain a right to occupy a physical location. As used in this paper, a baseline cost to obtain a right to occupy a physical location is the cost that a provider of a physical location charges to occupy the physical location without regard to attendees.

In a specific implementation, the attendee characteristics based location assignment system 308 functions according to an applicable system for assigning a user a physical location by matching user characteristics with attendee characteristics, such as the attendee characteristics based location assignment systems described in this paper. In assigning a location to a user, the attendee characteristics based location assignment system 308 can determine a location that a user might want to obtain a right to occupy. In determining a location, the attendee characteristics based location assignment system 308 can match a user with an attendee based on characteristics of the user and the attendee. Depending upon implementation-specific or other considerations, in matching a user with attendees based on user characteristics and attendee characteristics, the attendee characteristics based location assignment system 308 can match the user with the attendees if the user and the attendees have characteristics in common, as indicated by the user characteristics and the attendee characteristics. Further depending upon implementation-specific or other considerations, in matching a user with attendees based on user characteristics and attendee characteristics, the attendee characteristics based location assignment system 308 can match the user with attendees if the user and attendees have compatible characteristics, related characteristics, or codependent characteristics. Depending upon implementation-specific or other considerations, in matching a user with attendees based on user characteristics and attendee characteristics, the attendee characteristics based location assignment system 308 can match a user with attendees who are the subject of a user's likes or interests as indicated by user characteristics.

In a specific implementation, the user specific location value determination system 310 functions to determine a cost, specific to a user, for a right to occupy a physical location by the user. In determining a cost of a right to occupy a physical location for a user, the user specific location value determination system 310 can use a baseline cost to occupy the physical location, as indicated by physical location data stored in the physical location datastore 306. For example if an airline charges $400 for a seat, the user specific location value determination system 310 can determine that a cost to occupy the seat is $400.

In a specific implementation, the user specific location value determination system 310 functions to determine a cost for a right to occupy a physical location for a user that includes an increased value amount. The user specific location value determination system 310 can add an increased value amount to a baseline cost for a right to occupy the physical location to determine a cost for the right to occupy the physical location that includes an increased value amount. For example, if an airliner charges $400 to occupy a seat, e.g. a baseline cost, and an increased value amount is $300, then the user specific location value determination system 310 can determine that the cost to occupy the physical location is $700. An increased value amount that is included in a cost for a right to occupy a physical location can be specific to a user and vary between different users. For example, an increased value amount of user A for the right to occupy a specific physical location can be $300, while an increased value amount of user B for the right to occupy the specific physical location can be $500.

In a specific implementation, the user specific location value determination system 310 can determine an increased value amount to include in determining a cost of a right to occupy a physical location based on a match between a user and an attendee. Specifically, the user specific location value determination system 310 can determine an increased value amount from a match between a user and an attendee determined by the attendee characteristics based location assignment system 308 based on user and attendee characteristics. In determining an increased value amount, the user specific location value determination system 310 can determine an increased value amount based on a degree to which a user and an attendee are matched. For example, if a user and an attendee are matched at a high degree, e.g. a 90% match, then the user specific location value determination system 310 can determine a higher increased value amount than if the user and the attendee were matched at a lower degree. Depending upon implementation-specific or other considerations, the user specific location value determination system 310 can determine an increased value amount for a cost to obtain a right to occupy a physical location from a match between a user and an attendee that will occupy the physical location. Further depending upon implementation-specific or other considerations, the user specific location value determination system 310 can determine an increased value amount for a cost to obtain a right to occupy a physical location from a match between a user and an attendee that will occupy a neighboring physical location.

In a specific implementation, the user specific location value determination engine 310 functions to determine a degree to which a user and an attendee are matched based on user characteristics and attendee characteristics. In determining a degree to which a user and an attendee are matched based on user characteristics and attendee characteristics, the user specific location value determination system 310 can determine the degree based on the number of common characteristics that the user and the attendee have. For example, if a user and a attendee have 4 shared characteristics, then the user specific location value determination system 310 can determine that the user and the attendee are matched at a higher degree, than a degree to which the user and the attendee are matched at if they had only 3 shared characteristics. The user specific location value determination system 310 can also determine a degree to which a user and an attendee are matched based on the number of compatible characteristics, related characteristics, or codependent characteristics between the user and the attendee. Additionally, the user specific location value determination system 310 can determine a degree to which a user and an attendee are matched based on whether the attendee is the subject of a characteristics of the user. Depending upon implementation-specific or other considerations, the user specific location value determination system 310 can determine that a user and an attendee are matched 100% if the attendee is the subject of a characteristics of the user.

In a specific implementation, the attendee characteristics based location assignment system 308 can use a cost to obtain a right to occupy a physical location determined by the user specific location value determination system 310 to assign a physical location to a user. The attendee characteristics based location assignment system can use a cost specific to a user for a physical location, determined by the user specific location value determination system, to assign the physical location to the user. In assigning a physical location to a user, the attendee characteristics based location assignment system 308 can send a notification to the user that includes a cost determined by the user specific location value determination system 310. Further in assigning a physical location to a user, the attendee characteristics based location assignment system 308 can receive input from the user indicating whether the user is will to pay a cost determined by the user specific location value determination system 310.

In an example of operation of the example system shown in FIG. 3, the client device functions to send and receive data regarding a physical location that a user might be willing to occupy. In the example of operation, the physical location datastore 306 stores physical location data that includes a baseline cost to obtain a right to occupy a physical location. Further in the example of operation, of the example system shown in FIG. 3, the attendee characteristics based location assignment system 208 functions to match a user with an attendee based on characteristics of the user and the attendee and determine a location that the user might want to occupy based, at least in part, the attendee that is matched to the user. In the example of operation of the example system shown in FIG. 3, the user specific location value determination system determines a cost for a right to obtain the location determined by the attendee characteristics based location assignment system 308. Additionally, in the example system shown in FIG. 3, the user specific location value determination system determines an increased value amount for the user based on a degree to which the user and the attendee are matched and add the increased value amount to a baseline cost to determine the cost for a right to obtain the location.

Figure 4:
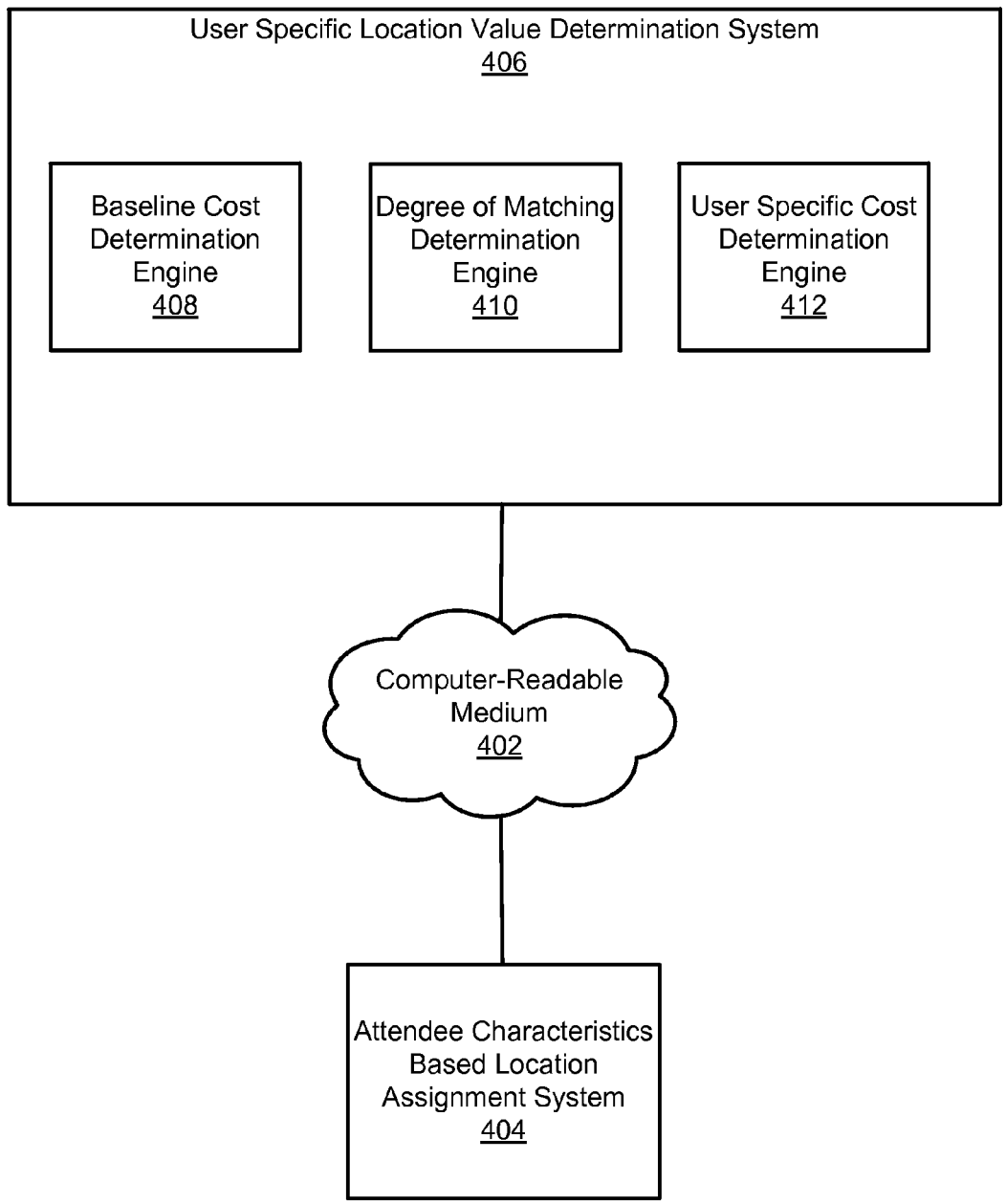
FIG. 4 depicts a diagram of another system for determining a cost specific to a user to obtain a right to occupy a physical location based on attendees that are matched to the user.

FIG. 4 depicts a diagram 400 of another system for determining a cost specific to a user to obtain a right to occupy a physical location based on attendees that are matched to the user. The example system shown in FIG. 4 includes a computer-readable medium 402, an attendee characteristics based location assignment system 404, and a user specific location value determination system 406. In the example system shown in FIG. 4, the attendee characteristics based location assignment system 404 and the user specific location value determination system 406 are coupled to each other through the computer-readable medium 402.

In a specific implementation, the attendee characteristics based location assignment system 404 functions according to an applicable system for assigning a user a physical location by matching user characteristics with attendee characteristics, such as the attendee characteristics based location assignment systems described in this paper. In assigning a location to a user, the attendee characteristics based location assignment system 404 can determine a location that a user might want to obtain a right to occupy. In determining a location, the attendee characteristics based location assignment system 404 can match a user with an attendee based on characteristics of the user and the attendee. Depending upon implementation-specific or other considerations, in matching a user with attendees based on user characteristics and attendee characteristics, the attendee characteristics based location assignment system 404 can match the user with the attendees if the user and the attendees have characteristics in common, as indicated by the user characteristics and the attendee characteristics. Further depending upon implementation-specific or other considerations, in matching a user with attendees based on user characteristics and attendee characteristics, the attendee characteristics based location assignment system 404 can match the user with attendees if the user and attendees have compatible characteristics, related characteristics, or codependent characteristics. Depending upon implementation-specific or other considerations, in matching a user with attendees based on user characteristics and attendee characteristics, the attendee characteristics based location assignment system 404 can match a user with attendees who are the subject of a user's likes or interests as indicated by user characteristics.

In a specific implementation, the user specific location value determination system 406 functions according to an applicable system for determining a cost specific to a user for a right to occupy a physical location. In determining a cost specific to a user for a right to occupy a physical location, the user specific location value determination system 406 can determine a baseline cost of a right to occupy a physical location. Further in determining a cost specific to a user for the right to occupy a physical location, the user specific location value determination system 406 can determine an increased value amount based on a degree to which a user is matched to attendees that will either occupy a physical location or neighboring physical locations.

In the example system shown in FIG. 4, the user specific location value determination system 406 includes a baseline cost determination engine 408, a degree of matching determination engine 410, and a user specific cost determination engine 412. In a specific implementation, the baseline cost determination engine 408 functions to determine a baseline cost to occupy a physical location determined by the attendee characteristics based location assignment system 404. Depending upon implementation-specific or other considerations, the baseline cost determination engine 408 determines a baseline cost from physical location data stored in a physical location datastore. Further depending upon implementation-specific or other considerations, the baseline cost determination engine 408 determines a baseline cost from a provider of a physical location.

In a specific implementation, the degree of matching determination engine 410 determines a degree to which a user and an attendee are matched based on user characteristics and attendee characteristics. In determining a degree to which a user and an attendee are matched based on user characteristics and attendee characteristics, the degree of matching determination engine 410 can determine the degree based on the number of common characteristics that the user and the attendee have. For example, if a user and a attendee have 4 shared characteristics, then the degree of matching determination engine 410 can determine that the user and the attendee are matched at a higher degree, than a degree to which the user and the attendee are matched at if they had only 3 shared characteristics. The degree of matching determination engine 410 can also determine a degree to which a user and an attendee are matched based on the number of compatible characteristics, related characteristics, or codependent characteristics between the user and the attendee. Additionally, the degree of matching determination engine 410 can determine a degree to which a user and an attendee are matched based on whether the attendee is the subject of a characteristics of the user. Depending upon implementation-specific or other considerations, the degree of matching determination engine 410 can determine that a user and an attendee are matched 100% if the attendee is the subject of a characteristics of the user.

In a specific implementation, the user specific cost determination engine 412 functions to determine a cost specific to a user of a right to occupy a physical location determined by the attendee characteristics based location assignment system 404. The user specific cost determination engine 412 can determine a cost specific to a user of a right to occupy a physical location that includes an increased value amount. The user specific cost determination engine 412 can add an increased value amount, determined form a degree to which a user and an attendee are matched determined by the degree of matching determination engine 410, to a baseline cost, determined by the baseline cost determination engine 408, to determine a cost specific to a user for the right to occupy the physical location that includes an increased value amount. For example, if an airliner charges $400 to occupy a seat, e.g. a baseline cost, and an increased value amount is $300, then the user specific cost determination engine 412 can determine that the cost to occupy the physical location is $700.

In a specific implementation, the user specific cost determination engine 412 functions to determine an increased value amount to include in determining a cost specific to a user for a right to occupy a physical location based on a match between a user and an attendee. Specifically, the user specific cost determination engine 412 can determine an increased value amount from a degree to which a user and attendee are matched, as determined by the degree of matching determination engine 410. For example, if a user and an attendee are matched at a high degree, e.g. a 90% match, then the user specific cost determination cost engine 412 can determine a higher increased value amount than if the user and the attendee were matched at a lower degree. Depending upon implementation-specific or other considerations, the user specific cost determination engine 412 can determine an increased value amount for a cost to obtain a right to occupy a physical location from a match between a user and an attendee that will occupy the physical location. Further depending upon implementation-specific or other considerations, the user specific cost determination engine 412 can determine an increased value amount for a cost to obtain a right to occupy a physical location from a match between a user and an attendee that will occupy a neighboring physical location.

In an example of operation of the example system shown in FIG. 4, the attendee characteristics based location assignment system 404 determines a physical location that a user might want to occupy based on an attendee matched to a user based on attendee and user characteristics. In the example of operation of the example system shown in FIG. 4, the baseline cost determination engine 408 determines a baseline cost of a right to occupy the physical location determined by the attendee characteristics based location assignment system 404. Further in the example of operation of the example system shown in FIG. 4, the degree of matching determination engine 410 determines a degree to which the user and the attendee are matched after being matched by the attendee characteristics based location assignment system 404. In the example of operation of the example system shown in FIG. 4, the user specific cost determination engine 412 determines an increased value amount specific to the user based on the degree to which the user and the attendees are matched, as determined by the degree of matching determination engine 410. Additionally, in the example of operation of the example system shown in FIG. 4, the user specific cost determination engine 412 determines a cost specific to a user of a right to occupy a physical location that includes the increased value amount.

Figure 5:
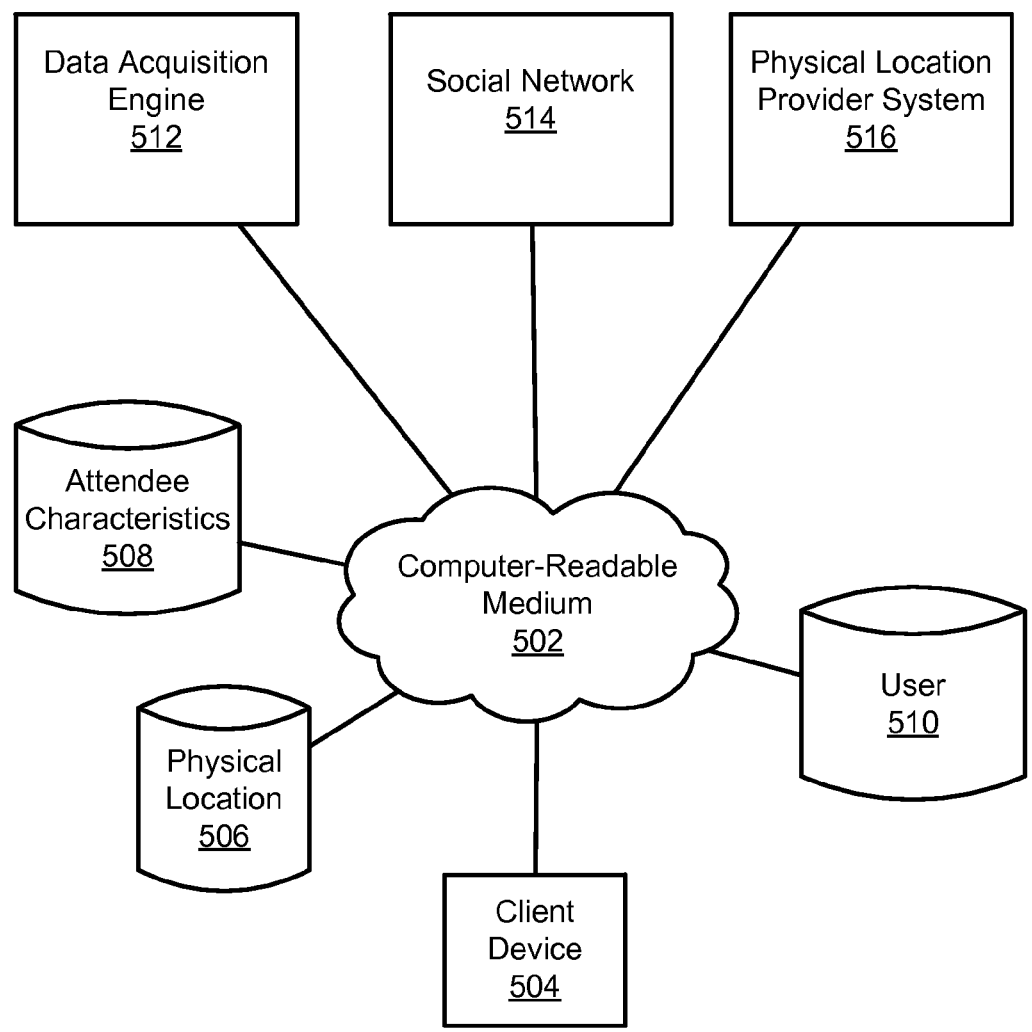
FIG. 5 depicts an example of a system for collecting data used in assigning a physical location to a user by matching the user to attendees.

FIG. 5 depicts an example 500 of a system for collecting data used in assigning a physical location to a user by matching the user to attendees. The example system shown in FIG. 5 includes a computer-readable medium 502, a client device 504, a physical location datastore 506, an attendee characteristics datastore 508, a user datastore 510, a data acquisition engine 512, a social network 514, and a physical location provider system 516. In the example system shown in FIG. 5, the client device 504, the physical location datastore 506, the attendee characteristics datastore 508, the user datastore 510, the data acquisition engine 512, the social network 514, and the physical location provider system 516 are coupled to each other through the computer-readable medium 502.

In a specific implementation, the client device 504 functions according to an applicable device for receiving and sending data. In sending and receiving data, the client device 504 can present physical locations to a user of the client device 204 that the user might be interested in obtaining a right to occupy. Further in sending and receiving data, the client device 504 can send input from a user used in obtaining a right to occupy a physical location, including an indication of whether the user wishes to obtain a right to access a physical location.

In a specific implementation, the physical location datastore 506 functions according to an applicable datastore for storing physical location data, such as the physical location datastores described in this paper. Physical location data stored in the physical location datastore 208 can include characteristics of a physical location, such as the number of people who can occupy the physical location for a specific amount of time, a description of the physical location, a description of neighboring physical locations, and times a user can occupy the physical location. Physical location data stored in the physical location datastore 506 can also include an identification of attendees who will occupy the physical location at a given time or neighboring physical locations at a given time. Depending upon implementation-specific or other considerations, physical location data stored in the physical location datastore 506 can include a cost to obtain a right to occupy a physical location. A cost to obtain a right to occupy a physical location can be a baseline cost, or a cost that includes an increased value amount based on a match between a user and attendees.

In a specific implementation, the attendee characteristics datastore 508 functions according to an applicable datastore for storing attendee characteristics data. Attendee characteristics stored in the attendee characteristics datastore 508 can include applicable information about an attendee such as their occupation, their education background, clubs and organizations that they are members of or are associated with, and their interests. Attendee characteristics stored in the attendee characteristics datastore 508 can also include an identification of an attendee and their contact information, e.g. e-mail address.

In a specific implementation, the user datastore 510 functions according to an applicable datastore for storing user data, such as the user datastores described in this paper. User characteristics stored in the user datastore 510 can include applicable information about a user, such as their occupation, their education background, clubs and organizations that they are members of or are associated with, and their interests. User data stored in the user datastore 510 can also include an identification of a user and their contact information, e.g. e-mail address.

In a specific implementation, the data acquisition engine 512 functions to acquire data. In acquiring data, the data acquisition engine 512 can acquire user characteristics, physical location data, or user data. Depending upon implementation-specific or other considerations, the data acquisition engine 512 can acquire data directly from the client device 504 or from input received from the client device 504.

In a specific implementation, the social network 514 is a social network of which a user of the client device 504 is part. In interacting with the systems described in this paper, a user of the client device 504 can interact with applicable systems described in this paper through the social network 514. For example, a user of the client device can receive notifications regarding physical locations determined that the user might want to occupy through the social network 514.

In a specific implementation, the physical location provider system 516 is a system of a provider of a physical location. For example, if a physical location provider is an airline, then the physical location provider system 516 can be the airliner's system. Depending upon implementation-specific or other considerations, the physical location provider system 516 provides physical location data. Further depending upon implementation-specific or other considerations, the physical location provider system 516 provides functions for obtaining a right to occupy a physical location.

In a specific implementation, the data acquisition engine 512 functions to acquire user data from a social network of which a user is associated. In acquiring user data from the social network 514, the data acquisition engine 512 can acquire user characteristics of a user. Depending upon implementation-specific or other considerations, user characteristics of a user acquired from the social network 514 can become attendee characteristics if a user obtains a right to occupy a physical location.

In a specific implementation, the data acquisition engine 512 functions to acquire physical location data from the physical location provider system 516. For example, the data acquisition engine can acquire information identifying and describing a physical location from the physical location provider system 516. Depending upon implementation-specific or other considerations, the data acquisition engine can acquire a baseline cost of a right to occupy a physical location from the physical location provider system 516.

Figure 6:
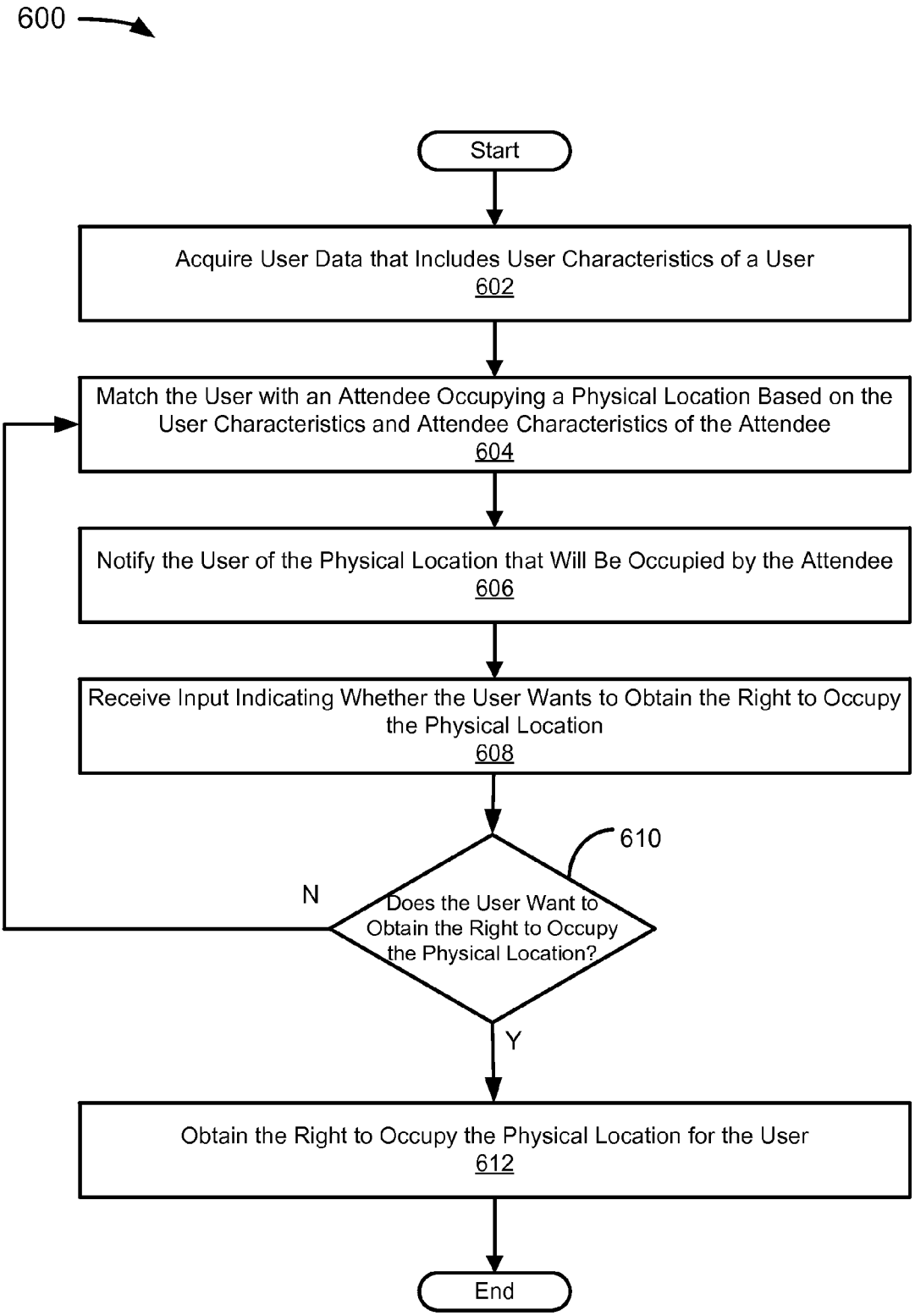
FIG. 6 depicts a flowchart of an example of a method for obtaining for a user a right to occupy a physical location based on an attendee that occupies the physical location who is matched to the user.

FIG. 6 depicts a flowchart 600 of an example of a method for obtaining for a user a right to occupy a physical location based on an attendee that occupies the physical location who is matched to the user. The flowchart 600 begins at module 602 where user data of a user is acquired. User data of a user acquired at module 602 includes characteristics of a user. User characteristics can be applicable information about a user, such as their occupation, their education background, clubs and organizations that they are members of or are associated with, and their interests. User data collected at module 602 can also include an identification of a user and their contact information, e.g. e-mail address.

The flowchart 600 continues to module 604, where the user is matched to an attendee occupying a physical location based on the user characteristics and attendee characteristics of the attendee. Depending upon implementation-specific or other considerations, at module 604, the user can be matched with an attendee based on user characteristics and attendee characteristics, if the user and the attendee have characteristics in common. Further depending upon implementation-specific or other considerations, at module 604, the user can be matched with an attendee if the user and the attendee have compatible characteristics, related characteristics, or codependent characteristics. Depending upon implementation-specific or other considerations, at module 604, the user can be matched with an attendee if the attendee is the subject of a user's likes or interests.

The flowchart 600 continues to module 606, where a notification is sent to the user notifying the user of the physical location that will be occupied by the attendee matched to the user. The notification can include a description of the physical location, a description of the attendee, and how the attendee and the user are matched. Depending upon implementation-specific or other considerations the notification can include a cost for a user to obtain a right to occupy the physical location with the attendee. A cost included in the notification for a user to obtain a right to occupy the physical location can be specific to the user. For example, a cost included in the notification can include a baseline cost to occupy the physical location and an increased value amount specific to the user and determined based on the degree to which the user and the attendee are matched.

The flowchart 600 continues to module 608 where input indicating whether the user wants to obtain the right to occupy the physical location that the attendee will occupy is received. Input indicating whether the user wants to obtain the right to occupy the physical location can be received from a client device used by the user. Input indicating whether the user wants to obtain the right to occupy the physical location can also be received through a social network of which the user is part. Depending upon implementation-specific or other considerations, input indicating whether the user wants to obtain the right to occupy the physical location can include payment information of the user that is used to obtain the right to occupy the physical location.

The flowchart 600 continues to decision point 610, where it is determined whether the user wants to obtain the right to occupy the physical location. At decision point 610, it can be determined whether the user wants to obtain the right to occupy the physical location based on input received at module 608. If it is determined that the user does not want to obtain the right to occupy the physical location, then the flowchart 600 continues back to module 604, where the user is matched with another attendee occupying a physical location based on the user characteristics and characteristics of the attendee.

If it is determined at decision point 610 that the user wants to obtain the right to occupy the physical location, then the flowchart 600 continues to module 612. At module 612, the right to occupy the physical location is obtained for the user. Depending upon implementation-specific or other considerations, in obtaining a right to occupy the physical location for the user, the user can be registered to occupy the physical location, or the right to occupy the physical location can be purchased for the user. Further depending upon implementation-specific or other considerations, the right to occupy the physical location can be purchased for the user using payment info that is part of input received at module 608. In obtaining the right to occupy the physical location for the user, functionalities can be provided to a user for obtaining the right to occupy the physical location. For example, the user can be sent a link to a landing page where the user can obtain the right to occupy the physical location.

Figure 7:
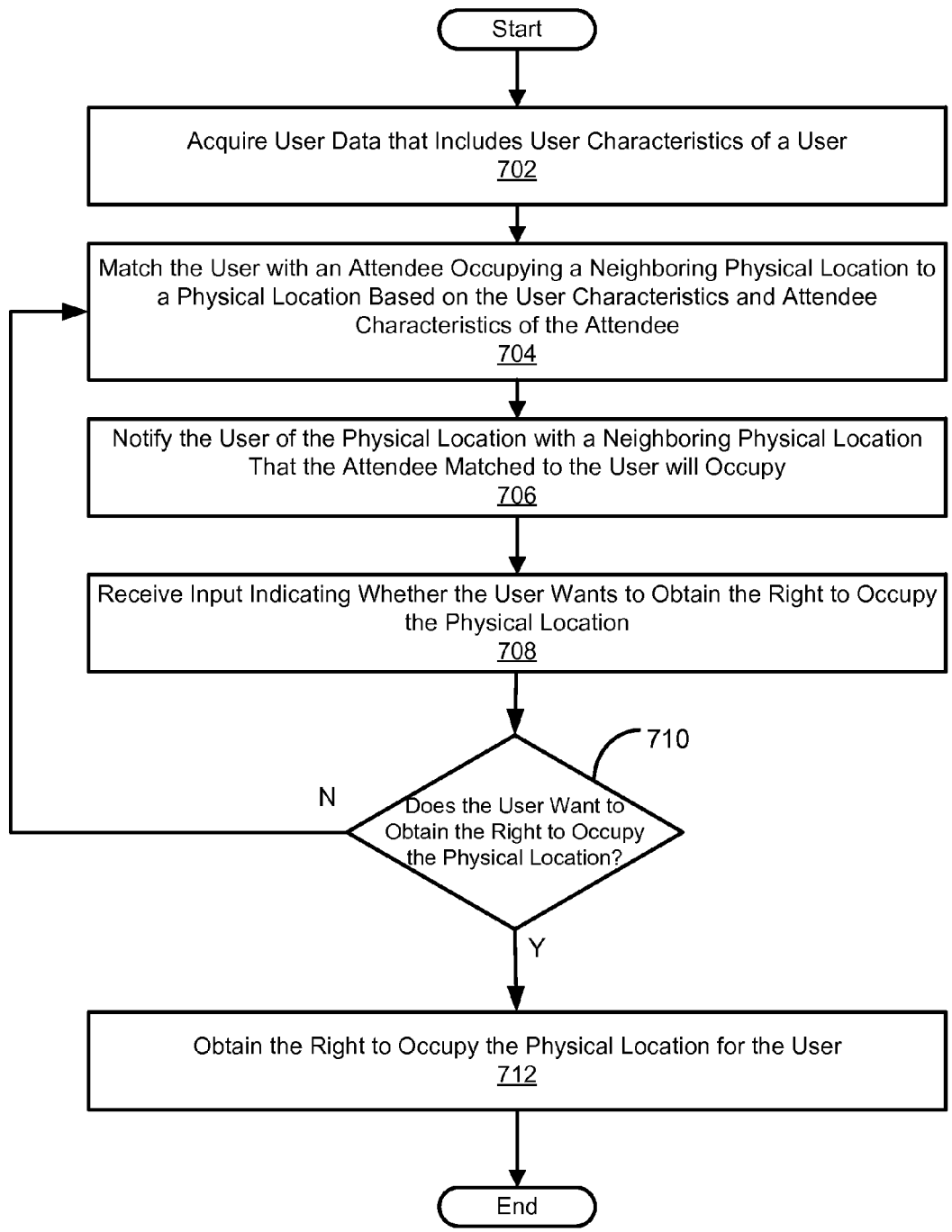
FIG. 7 depicts a flowchart of an example of a method for obtaining for a user a right to occupy a physical location at which an attendee, who is matched to the user, will occupy a neighboring physical location.

FIG. 7 depicts a flowchart 700 of an example of a method for obtaining for a user a right to occupy a physical location at which an attendee, who is matched to the user, will occupy a neighboring physical location. The flowchart 700 begins at module 702 where user data of a user is acquired. User data of a user acquired at module 702 includes characteristics of a user. User characteristics can be applicable information about a user, such as their occupation, their education background, clubs and organizations that they are members of or are associated with, and their interests. User data collected at module 702 can also include an identification of a user and their contact information, e.g. e-mail address.

The flowchart 700 continues to module 704, where the user is matched with an attendee occupying a neighboring physical location to a physical location based on the user characteristics and attendee characteristics. Depending upon implementation-specific or other considerations, at module 704, the user can be matched with an attendee based on user characteristics and attendee characteristics, if the user and the attendee have characteristics in common. Further depending upon implementation-specific or other considerations, at module 704, the user can be matched with an attendee if the user and the attendee have compatible characteristics, related characteristics, or codependent characteristics. Depending upon implementation-specific or other considerations, at module 704, the user can be matched with an attendee if the attendee is the subject of a user's likes or interests.

The flowchart 700 continues to module 706, where the user is notified of the physical location with a neighboring physical location that the attendee matched to the user at module 704 will occupy. The notification can include a description of the physical location, a description of the attendee, and how the attendee and the user are matched. Depending upon implementation-specific or other considerations the notification can include a cost for a user to obtain a right to occupy the physical location with the neighboring physical location that the attendee will occupy. A cost included in the notification for a user to obtain a right to occupy the physical location can be specific to the user. For example, a cost included in the notification can include a baseline cost to occupy the physical location and an increased value amount specific to the user and determined based on the degree to which the user and the attendee are matched.

The flowchart 700 continues to module 708 where input indicating whether the user wants to obtain the right to occupy the physical location with the neighboring physical location that the attendee will occupy is received. Input indicating whether the user wants to obtain the right to occupy the physical location can be received from a client device used by the user. Input indicating whether the user wants to obtain the right to occupy the physical location can also be received through a social network of which the user is part. Depending upon implementation-specific or other considerations, input indicating whether the user wants to obtain the right to occupy the physical location with the neighboring physical location can include payment information of the user that is used to obtain the right to occupy the physical location.

The flowchart 700 continues to decision point 710, where it is determined whether the user wants to obtain the right to occupy the physical location with the neighboring physical location that the matched attendee will occupy. At decision point 710, it can be determined whether the user wants to obtain the right to occupy the physical location based on input received at module 708. If it is determined that the user does not want to obtain the right to occupy the physical location, then the flowchart 700 continues back to module 704, where the user is matched with another attendee occupying a neighboring physical location to a physical location based on the user characteristics and characteristics of the attendee.

If it is determined at decision point 710 that the user wants to obtain the right to occupy the physical location, then the flowchart 700 continues to module 712. At module 712, the right to occupy the physical location with a neighboring physical location that a matched attendee will occupy is obtained for the user. Depending upon implementation-specific or other considerations, in obtaining a right to occupy the physical location for the user, the user can be registered to occupy the physical location, or the right to occupy the physical location can be purchased for the user. Further depending upon implementation-specific or other considerations, the right to occupy the physical location can be purchased for the user using payment info that is part of input received at module 708. In obtaining the right to occupy the physical location for the user, functionalities can be provided to a user for obtaining the right to occupy the physical location. For example, the user can be sent a link to a landing page where the user can obtain the right to occupy the physical location.

Figure 8:
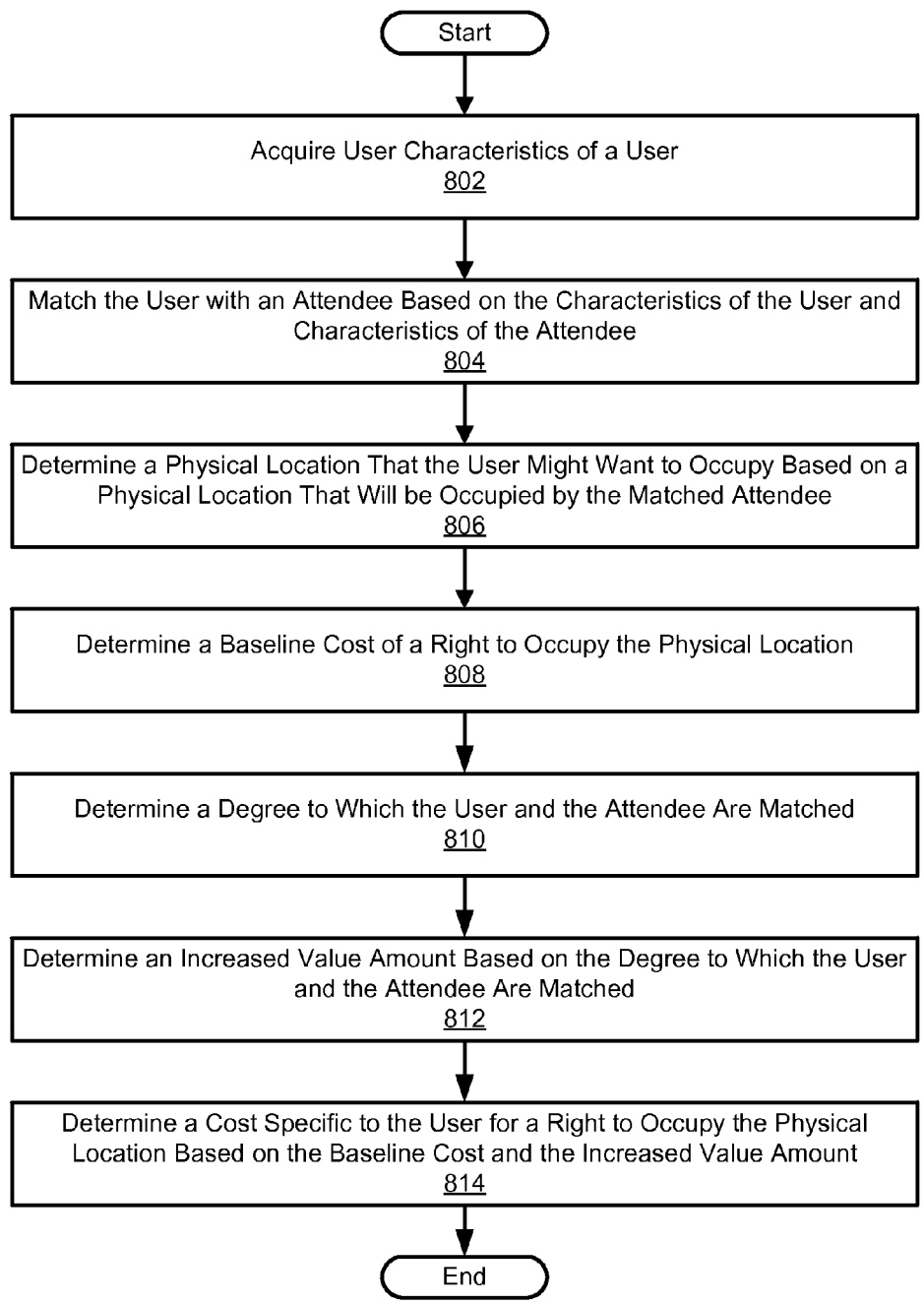
FIG. 8 depicts a flowchart of an example of a method for determining a cost specific to a user to obtain a right to occupy a physical location.

FIG. 8 depicts a flowchart 800 of an example of a method for determining a cost specific to a user to obtain a right to occupy a physical location. The flowchart 800 begins at module 802, where user characteristics of a user are acquired. User characteristics, acquired at module 802, can be applicable information about a user, such as their occupation, their education background, clubs and organizations that they are members of or are associated with, and their interests. Acquired user characteristics can be part of user data acquired for a user. User characteristics can be acquired from a social network of which a user is part. For example, likes, interests, occupation, education background, and clubs and organization that a user are members of, can be determined from a social network of which the user is part.

The flowchart 800 continues to module 804, where the user is matched with an attendee based on the characteristics of the user and characteristics of the attendee. Depending upon implementation-specific or other considerations, at module 804, the user can be matched with an attendee based on user characteristics and attendee characteristics, if the user and the attendee have characteristics in common. Further depending upon implementation-specific or other considerations, at module 804, the user can be matched with an attendee if the user and the attendee have compatible characteristics, related characteristics, or codependent characteristics. Depending upon implementation-specific or other considerations, at module 804, the user can be matched with an attendee if the attendee is the subject of a user's likes or interests.

The flowchart 800 continues to module 806, where a physical location that the user might to want to occupy is determined based on a physical location that will be occupied by the matched attendee. Depending upon implementation-specific or other considerations, a physical location determined at module 806 that a user might want to occupy is the same physical location that the attendee that is matched to the user will occupy. Further depending upon implementation-specific or other considerations, a physical location determined at module 806 that a user might want to occupy has a neighboring physical location that the attendee that is matched to the user will occupy.

The flowchart 800 continues to module 808, where a baseline cost of a right to occupy the physical location determined at module 808 that a user might want to occupy is determined. A baseline cost of a right to occupy the physical location can be determined from physical location data of the physical location. A baseline cost of a right to occupy the physical location can also be determined from a provider of the physical location.

The flowchart 800 continues to module 810, where a degree to which the user and the attendee are matched is determined. A degree to which a user and an attendee are matched can be determined based on user characteristics and attendee characteristics. A degree to which the user and the attendee are matched can be determined based on the number of common characteristics that the user and the attendee have. For example, if the user and the attendee have 4 shared characteristics, then it can be determined that the user and the attendee are matched at a higher degree, than a degree to which the user and the attendee are matched at if they had only 3 shared characteristics. A degree to which the user and then attendee are matched can also be based on the number of compatible characteristics, related characteristics, or codependent characteristics between the user and the attendee. Additionally, a degree to which a user and an attendee are matched based on whether the attendee is the subject of a characteristics of the user.

The flowchart 800 continues to module 812, where an increased value amount of the right to occupy the physical location is determined based on the degree to which the user and the attendee are matched, as determined at module 810. For example, if the user and the attendee are matched at a high degree, e.g. a 90% match, then a higher increased value amount can be determined than if the user and the attendee were matched at a lower degree. In being based on the degree to which the user and the attendee are matched, an increased value amount determined at module 812 can be specific to the user based on the characteristics of the user.

The flowchart 800 continues to module 814, where a cost specific to the user for a right to occupy the physical location is determined. In determining a cost specific to the user for a right to occupy the physical location can be determined by adding the baseline cost, determined at module 808, to the increased value amount specific to the user, determined at module 814.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:

acquiring, by a processor, user data that includes user characteristics of a user, the user characteristics being acquired from a first datastore associated with a first social network account associated with the user, the user characteristics being acquired over a communication network;

matching, by the processor, the user with a first attendee based on the user characteristics and first attendee characteristics of the first attendee, the first attendee characteristics being acquired from a second datastore associated with a second social network account associated with the first attendee, the first attendee characteristics being acquired over the communication network;

matching, by the processor, the user with a second attendee based on the user characteristics and second attendee characteristics of the second attendee, the second attendee characteristics being acquired from a third social network account associated with the second attendee, the second attendee characteristics being acquired over the communication network;

determining, by the processor, a first physical location based on a first location that the first attendee will occupy;

determining, by the processor, a second physical location based on a second location that the second attendee will occupy;

determining, by the processor, a first baseline cost to obtain a first right to occupy the first physical location;

determining, by the processor, a second baseline cost to obtain a second right to occupy the second physical location;

determining, by the processor, a first relative match value based on the matching of the user with the first attendee, the first relative match value being capable of indicating a complete match between the user and the first attendee, and the first relative match value being capable of indicating a less than complete match between the user and the first attendee, the less than complete match between the user and the first attendee being different from no match between the user and the first attendee;

determining, by the processor, a second relative match value based on the matching of the user with the second attendee, the second relative match value being capable of indicating a complete match between the user and the second attendee, and the second relative match value being capable of indicating a less than complete match between the user and the second attendee, the less than complete match between the user and the second attendee being different from no match between the user and the first attendee, the second relative match value being different from the first relative match value;

determining, by the processor, a first relative increased value amount based on the first relative match value;

determining, by the processor, a second relative increased value amount based on the second relative match value;

adding, by the processor, the first relative increased value amount to the first baseline cost to generate a first cost specific to the user for the first right to occupy the first physical location;

adding, by the processor, the second relative increased value amount to the second baseline cost to generate a second cost specific to the user for the second right to occupy the second physical location;

sending, through a first social network interface displayed on a client device of the user, a notification including an identification of the first and second physical locations, the first and second costs specific to the user for the first and second rights to occupy the first and second physical locations, an identification of the first and second attendees, and the first and second attendee characteristics to the user;

selecting, through a second social network interface displayed on a client device of the user, the first right to occupy the first physical location or the second right to occupy the second physical location, the selecting based on any of a first difference between the first cost specific to the user and the second cost specific to the user or a second difference between the first relative match value and the second relative match value;

obtaining, by the processor, the selected right to occupy the selected physical location for the user.

2. The method of claim 1, wherein the location that the attendee will occupy is the determined physical location.

3. The method of claim 1, wherein the location that the attendee will occupy is a neighboring physical location to the determined physical location.

4. The method of claim 1, wherein the physical location is at a free event and obtaining the right to occupy the physical location for the user includes registering the user.

5. The method of claim 1, further comprising updating physical location data of the physical location with an identification of the user if the right to occupy the physical location is obtained for the user.

6. The method of claim 1, further comprising updating attendee characteristics data to include the identification of the user and the user characteristics if the right to occupy the physical location is obtained for the user.

7. The method of claim 1, wherein the first and second social network interfaces comprise the same social network interface.

8. The method of claim 1, wherein the first and second social network interfaces comprise different social network interfaces.

9. The method of claim 1, wherein the first and second datastores comprise the same datastore.

10. The method of claim 1, wherein the first and second datastores comprise different datastores.

11. A system comprising one or more processors and memory coupled to the one or more processors, the memory storing computer program instructions configured to instruct the one or more processors to perform a method, the method comprising:

acquiring user data that includes user characteristics of a user, the user characteristics being acquired from a first datastore associated with a first social network account associated with the user, the user characteristics being acquired over a communication network;

matching the user with a first attendee based on the user characteristics and first attendee characteristics of the first attendee, the first attendee characteristics being acquired from a second datastore associated with a second social network account associated with the first attendee, the first attendee characteristics being acquired over the communication network;

matching, by the processor, the user with a second attendee based on the user characteristics and second attendee characteristics of the second attendee, the second attendee characteristics being acquired from a third social network account associated with the second attendee, the second attendee characteristics being acquired over the communication network;

determining a first physical location based on a first location that the first attendee will occupy;

determining a second physical location based on a second location that the second attendee will occupy;

determining a first baseline cost to obtain a first right to occupy the first physical location;

determining a second baseline cost to obtain a second right to occupy the second physical location;

determining a first relative match value based on the matching of the user with the first attendee, the first relative match value being capable of indicating a complete match between the user and the first attendee, and the first relative match value being capable of indicating a less than complete match between the user and the first attendee, the less than complete match between the user and the first attendee being different from no match between the user and the first attendee;

determining, a second relative match value based on the matching of the user with the second attendee, the second relative match value being capable of indicating a complete match between the user and the second attendee, and the second relative match value being capable of indicating a less than complete match between the user and the second attendee, the less than complete match between the user and the second attendee being different from no match between the user and the first attendee, the second relative match value being different from the first relative match value;

determining a first relative increased value amount based on the first relative match value;

determining, a second relative increased value amount based on the second relative match value;

adding the first relative increased value amount to the first baseline cost to generate a first cost specific to the user for the first right to occupy the first physical location;

adding the second relative increased value amount to the second baseline cost to generate a second cost specific to the user for the second right to occupy the second physical location;

sending, through a first social network interface displayed on a client device of the user, a notification including an identification of the first and second physical locations, the first and second costs specific to the user for the first and second rights to occupy the first and second physical locations, an identification of the first and second attendees, and the first and second attendee characteristics to the user;

selecting, through a second social network interface displayed on a client device of the user, the first right to occupy the first physical location or the second right to occupy the second physical location, the selecting based on any of a first difference between the first cost specific to the user and the second cost specific to the user or a second difference between the first relative match value and the second relative match value;

obtaining the selected right to occupy the selected physical location for the user.

12. The system of claim 11, wherein the location that the attendee will occupy is the determined physical location.

13. The system of claim 11, wherein the location that the attendee will occupy is a neighboring physical location to the determined physical location.

14. The system of claim 11, further comprising updating physical location data of the physical location with an identification of the user if the right to occupy the physical location is obtained for the user.

15. The system of claim 11, further comprising updating attendee characteristics data to include the identification of the user and the user characteristics if the right to occupy the physical location is obtained for the user.

16. The system of claim 11, further comprising:
determining a cost specific to the user for the right to occupy the physical location based on the matching of the user and the attendee;
sending the notification including the cost specific to the user for the right to occupy the physical location to the user;
paying the cost specific to the user for the right to occupy the physical location or providing functionalities to the user for paying the cost specific to the user for the right to occupy the physical location to obtain the right to occupy the physical location for the user.

17. The system of claim 11, wherein the first and second social network interfaces comprise the same social network interface.

18. The system of claim 11, wherein the first and second social network interfaces comprise different social network interfaces.

19. The system of claim 11, wherein the first and second datastores comprise the same datastore.

20. The system of claim 11, wherein the first and second datastores comprise different datastores.

* * * * *